US011710018B2

(12) United States Patent
Yu et al.

(10) Patent No.: US 11,710,018 B2
(45) Date of Patent: Jul. 25, 2023

(54) AUTOMATIC RESET METHOD FOR CONSUMABLE CHIP, AND CONSUMABLE CHIP

(71) Applicant: Hangzhou Chipjet Technology Co., LTD., Hangzhou (CN)

(72) Inventors: Haijian Yu, Hangzhou (CN); Chuanjuan Song, Hangzhou (CN); Menglog Yu, Hangzhou (CN)

(73) Assignee: Hangzhou Chipjet Technology Co., LTD., Hangzhou (CN)

( * ) Notice: Subject to any disclaimer, the term of this patent is extended or adjusted under 35 U.S.C. 154(b) by 0 days.

(21) Appl. No.: 17/618,308

(22) PCT Filed: Apr. 27, 2020

(86) PCT No.: PCT/CN2020/087227
§ 371 (c)(1),
(2) Date: Dec. 10, 2021

(87) PCT Pub. No.: WO2020/248734
PCT Pub. Date: Dec. 17, 2020

(65) Prior Publication Data
US 2022/0366201 A1 Nov. 17, 2022

(30) Foreign Application Priority Data
Jun. 13, 2019 (CN) .......................... 201910509220.X

(51) Int. Cl.
*G06K 15/00* (2006.01)
(52) U.S. Cl.
CPC ................ *G06K 15/4075* (2013.01)

(58) Field of Classification Search
CPC ... G06K 15/4075; G06F 3/121; G06F 3/1219; G06F 3/1235
See application file for complete search history.

(56) References Cited

U.S. PATENT DOCUMENTS

2013/0208320 A1  8/2013  Suzuki et al.
2014/0376931 A1* 12/2014  Thacker ............ G03G 15/5004
                                                          399/12
(Continued)

FOREIGN PATENT DOCUMENTS

CN   101804738 A    8/2010
CN   201685531 U   12/2010
(Continued)

OTHER PUBLICATIONS

International Search Report from International Application No. PCT/CN2020/087227, dated Jul. 29, 2020.

*Primary Examiner* — Iriana Cruz
(74) *Attorney, Agent, or Firm* — Morse, Barnes-Brown & Pendleton, P.C.; Sean D. Detweiler, Esq.

(57) ABSTRACT

Provided are an automatic reset method for a consumable chip and the consumable chip. The automatic reset method includes: in response to determining that an ink amount state is an ink-out state, entering an automatic reset state and shielding a printer command; turning off a core of the chip and shielding a printer dock command in the automatic reset state; entering a reset allowing state after shielding N groups of printer dock commands in the automatic reset state; and resetting ink amount data and turning on the core of the chip in the reset allowing state.

18 Claims, 1 Drawing Sheet

(56) References Cited

U.S. PATENT DOCUMENTS

| | | | | |
|---|---|---|---|---|
| 2015/0206039 A1* | 7/2015 | Liu | ..................... | G06K 15/40 |
| | | | | 358/1.15 |
| 2015/0286453 A1 | 10/2015 | Thacker et al. | | |
| 2018/0281438 A1* | 10/2018 | Horade | ................ | B41J 2/17523 |
| 2019/0196750 A1* | 6/2019 | Duan | ..................... | G06F 3/121 |

FOREIGN PATENT DOCUMENTS

| | | | |
|---|---|---|---|
| CN | 102173208 | A | 9/2011 |
| CN | 103640339 | A | 3/2014 |
| CN | 105818541 | A | 8/2016 |
| CN | 205871503 | U | 1/2017 |
| CN | 106671610 | A | 5/2017 |
| CN | 106739533 | A | 5/2017 |
| CN | 206416692 | U | 8/2017 |
| CN | 107901608 | A | 4/2018 |
| CN | 108068463 | A | 5/2018 |
| CN | 108121425 | A | 6/2018 |
| CN | 108128035 | A | 6/2018 |
| CN | 108407467 | A | 8/2018 |
| CN | 207901883 | U | 9/2018 |
| CN | 109501465 | A | 3/2019 |
| CN | 110103591 | A | 8/2019 |
| DE | 20 2009 003 839 | U1 | 6/2009 |
| EP | 0878305 | A2 | 11/1998 |
| EP | 3115214 | A1 | 1/2017 |
| WO | WO-2018/006265 | A1 | 1/2018 |

* cited by examiner

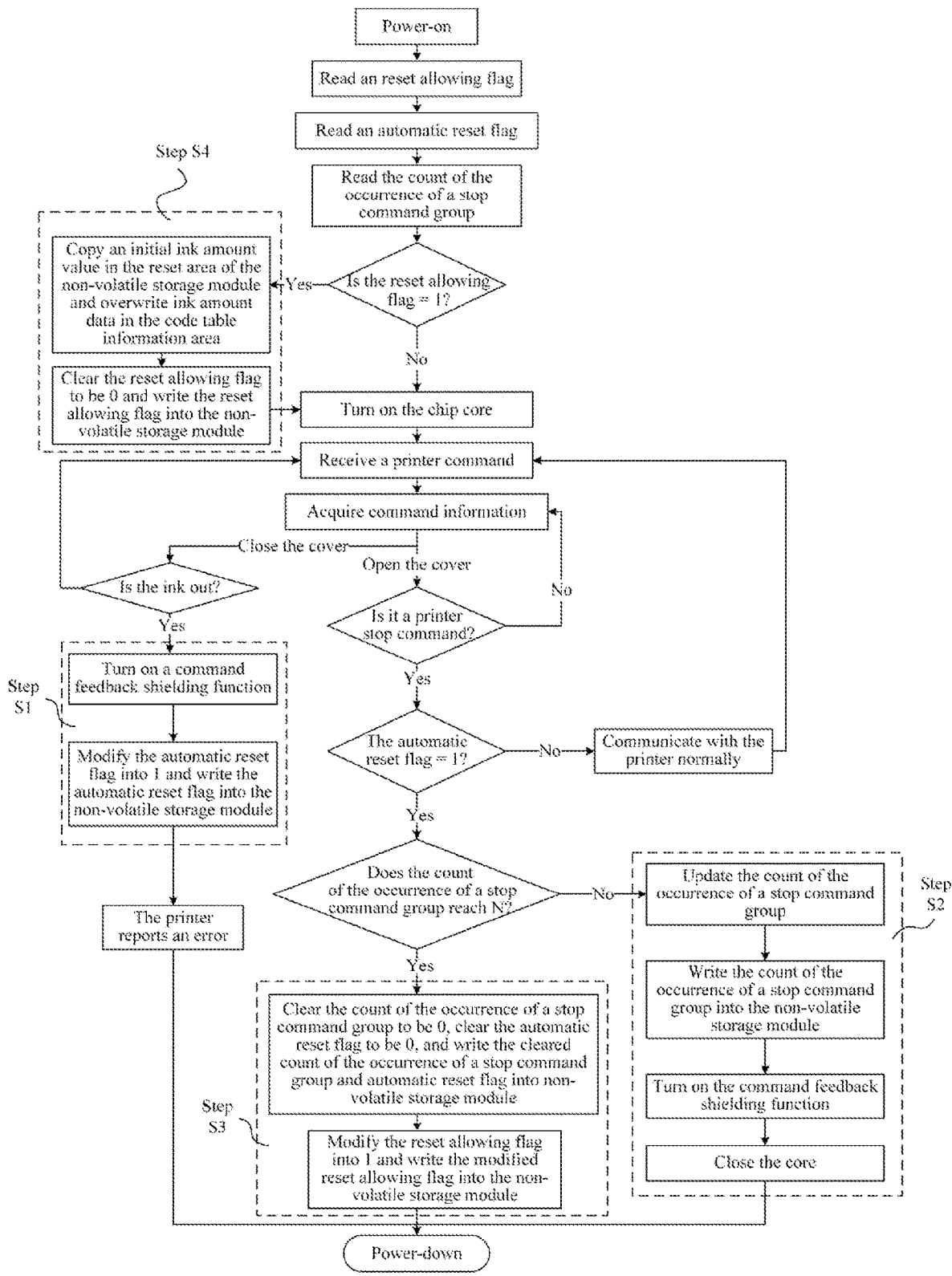

AUTOMATIC RESET METHOD FOR CONSUMABLE CHIP, AND CONSUMABLE CHIP

RELATED APPLICATIONS

This application is a national stage filing under 37 U.S.C. 371 of International Application No. PCT/CN2020/087227, filed Apr. 27, 2020, which claims priority to Chinese Patent Application No. 201910509220.X filed Jun. 13, 2019. The entire teachings of said applications are incorporated herein by reference herein.

TECHNICAL FIELD

The present disclosure relates to the technical field of printer consumables, and specifically, to an automatic reset method for a consumable chip and a consumable chip.

BACKGROUND

At present, chips are generally used as the medium for storing information and usage amount of consumables. After the consumables placed in the imaging cartridge are consumed, ink-out data is written into the chip, and then the imaging cartridge and the chip will not be able to reused, which not only wastes resources, but also pollutes the environment.

The imaging device monitors the multiple serial numbers in the consumables chip. Once a serial number is recorded as used by the imaging device, this serial number cannot pass the verification of the imaging device thereafter. Therefore, the consumables chips on the market are required to obtain enough legal serial numbers to ensure the stable performance of the storage chip. For example, in the communication method for a consumable chip and an imaging device disclosed in the patent application publication No. CN109334259A, filed on Feb. 15, 2019, when the authentication detection of a consumable chip in the imaging device fails, the consumable chip re-receives the command data sent from the imaging device, and feeds back a response signal and another serial number to the imaging device until the authentication detection of the consumable chip passes the transmission of the image device.

For example, the utility model patent No. CN201109239Y granted Sep. 3, 2008 provides a chip including a switch device connected between an I/O pin of a microcontroller and a signal terminal. When the ink margin information needs to be reset, the ink cartridge can be removed and the switch device is toggled. When the ink cartridge is reinstalled onto the printer, the microcontroller resets the ink margin information after detecting that the switch device is toggled.

The utility model patent No. CN205871503U granted Jan. 11, 2017 provides a device for achieving an ink cartridge unplug-and-plug-free function, and the device includes a connection port connected with a printer, a security authentication chip, a power supply device connected with the security authentication chip, a logic control device, and a reset device, where the power supply device is used for providing power for the security authentication chip for running during the resetting. The security authentication chip is independent of the ink cartridge and is connected outside the printer body so that the ink cartridge can be recycled and is free from unplugging and plugging.

SUMMARY

Technical Problem

In the technical solution of patent No. CN201109239Y, the chip determines whether to perform the ink amount reset operation by detecting the state of the switch device, and such a solution has the following defects.

1. The change of the state of the switch device still requires manual operation by the user, and the manual operation is inconvenient and error-prone.

2. The connection and disconnection of the switch device cause changes in the load of the chip circuit, affecting the stability of the working state and service life of other electrical components and thus affecting the stability in use and service life of the entire chip.

However, although the technical solution of patent No. CN205871503U proposes to automatically control the on-off state of the relay through software to prevent the user from manually inserting and pulling the ink cartridge chip, 1. a switch key or switch devices such as a relay is required; and 2. in order to enabling the software to control the on-off of the relay, the power supply device is required to provide the power to support the chip to run during the resetting (the state in which the chip is disconnected from the printer). The power supply device is implemented in the following ways.

1) The power supply device is implemented by using a relatively small capacitor which stores electric energy when the chip is connected to the printer and discharges to supply power to the chip when the chip is disconnected from the printer. However, the discharge time of the capacitor is short and the discharging is unstable, which may lead to power failure before the resetting is completed.

2) An additional line is connected with the power line of the printer to supply power to the chip. When the chip is disconnected from the printer, this additional line remains connected and thus provides power from the printer to the chip. However, the printer needs to be modified, which is cumbersome to operate and unsafe for the printer.

3) The power supply device is implemented by using a storage battery. However, a peripheral circuit needs to be built, the circuit structure is complex, the chip volume is large, the cost is high, and the storage battery needs to be replaced regularly.

Technical Solution

In order to solve one or more of the preceding technical problems, the present disclosure provides an automatic reset method for a consumable chip. The method includes the steps described below.

In response to determining that an ink amount state is an ink-out state, an automatic reset state is entered and a printer command is shielded.

A printer dock command is shielded and a chip core is turned off in the automatic reset state.

A reset allowing state is entered after N groups of printer dock commands are shielded in the automatic reset state.

Ink amount data is reset and the chip core is turned on in the reset allowing state.

The preceding technical solution is fully controlled by a software program, the automatic reset of the chip can be achieved without the need of a switch device and a power supply device, unplugging and plugging operation does not need to be performed on the consumables, and consumable reset can be achieved only by opening and closing a printer consumable cover.

In an embodiment, an automatic reset flag is rewritten into a specific value and then written into a storage module to cause the chip to enter the automatic reset state.

In an embodiment, in the automatic reset state, whether a received printer command is a printer dock command and whether a count of groups of currently shielded printer dock commands reaches a preset threshold are determined, and a printer command feedback shielding function is then turned on and the chip core is turned off or the chip is caused to enter the reset allowing state according to the determination result.

In an embodiment, in the automatic reset state, in response to receiving a first piece of printer dock command, the printer command feedback shielding function is turned on and the chip core is turned off until the count of groups of the shielded printer dock commands reaches the preset threshold.

In an embodiment, in response to determining that the received printer command is a printer dock command and that the count of groups of the currently shielded printer dock commands does not reach the preset threshold, the chip shields the received printer dock command, updates the count of groups of the shielded printer dock commands, writes the updated count of groups of the shielded printer dock commands into the storage module, the printer command feedback shielding function is turned on, and the chip core is turned off.

In an embodiment, in response to determining that the received printer command is a printer dock command and that the count of groups of the currently shielded printer dock commands reaches the preset threshold, the chip clears the count of groups of the currently shielded printer dock commands and a value of an automatic reset flag, sets a reset allowing flag to a specific value, and writes the reset allowing flag into the storage module, so that the chip enters the reset allowing state.

In an embodiment, in the reset allowing state, ink amount information of a code table information area is overwritten with a storage module initial ink amount to achieve the reset of the ink amount data, and then the chip core is turned on.

In an embodiment, the method further includes the step of exiting the reset allowing state after resting the ink amount data.

In an embodiment, in the reset allowing state, after the ink amount data is reset, the set reset allowing flag is modified into a non-specific value, and the modified reset allowing flag is written into the storage module to cause the chip to exit the reset allowing state.

The present disclosure further provides a consumable chip. The consumable chip includes a chip core, a storage module, and a control module.

The storage module includes a code table information area for storing current ink amount data and a function configuration parameter area for storing a reset allowing flag, an automatic reset flag, and a count of groups of shielded dock commands.

The control module is used for applying the automatic reset method described above.

The method in the present disclosure is fully controlled by a software program without the need of a switch device and a power supply device so that the printer determines whether the ink cassette is plugged according to chip feedback data, so as to achieve the automatic reset of the chip. Unplugging and plugging operation does not need to be performed on the consumables, and consumable reset can be achieved only by opening and closing a printer consumable cover.

Beneficial Effect

The present disclosure has the beneficial effects described below.

1. There is no need to add hardware and low cost.
2. The integration level is high so that the volume of the chip is small.
3. The method is fully achieved by software, and the upgrade can be achieved only by updating the software.
4. The original circuit structure of the chip does not need to be changed, the chip and the printer work more stably, and the failure rate is lower.

BRIEF DESCRIPTION OF DRAWINGS

FIG. 1 is a flowchart of a consumables chip according to Embodiment one of the present disclosure.

DETAILED DESCRIPTION

Embodiments of the present disclosure will be described below in detail in conjunction to the drawings. The embodiments are intended to illustrate the present disclosure and not to limit the present disclosure. Those of ordinary skill in the art can make modifications to the embodiments as needed on the premise that no creative work is done after reading through the specification. Any modification within the scope of the claims is protected.

Embodiment One

An automatic reset method for consumable chip is provided, and the method includes the steps described below.

In step S1, in response to determining that an ink amount state is an ink-out state, the chip enters an automatic reset state and a printer command is shielded.

The "ink out" in the present disclosure may be a variety of cases, such as: 1. the ink consumption amount reaches a threshold; 2. the number of printing pages of the printer reaches a threshold; 3. the printing time reaches a threshold; and 4. the remaining ink amount reaches a threshold. The following is described by using an example in which the ink consumption amount reaches a threshold. The consumable chip acquires an old ink amount INK_old and a new ink amount INK_new from a register of the chip core according to a command sent by the printer, calculates a difference value (the difference value=(INK_old−INK_new), that is, the ink consumption amount of the current printing operation), and accumulates the ink consumption amount of each printing operation (that is, the total consumption amount) by repeating the above operations to determine the ink amount state. The automatic reset state of the chip can be marked by an automatic reset flag in the storage module. When the automatic reset flag is a specific value, it indicates that the chip is in or reaches the automatic reset state, and when the automatic reset flag is a non-specific value, it indicates that the chip is not in or does not reach the automatic reset state. For example, in the embodiment, when the value of the automatic reset flag is a specific value "1" or a high level, it indicates that the chip is in the automatic reset state; and when the value of the automatic reset flag is a non-specific value "0" or a low level, it indicates that the chip is not in the automatic reset state. In this step, when it is determined that the ink amount state is the ink-out state, the automatic reset flag can be modified into "1" or a high level and written into the storage module, thereby causing the chip to enter the automatic reset state. The step "a printer command is shielded" in the present disclosure means that the chip does not make any feedback or response to the received printer command. The on or off of a printer command feedback shielding function of the chip can be marked by a printer command shielding flag. When the printer command feedback shielding function is turned on, the chip does not make any feedback or response to the received printer command, and when the printer command feedback shielding function is turned off, the chip makes feedback or response to the received printer command. When the printer command shielding flag is a specific value, it indicates that the printer command feedback shielding function is turned on, and when the printer command shielding flag is a non-specific value, it indicates that the printer command feedback shielding function is turned off. For example, in the embodiment, when the value of the printer command shielding flag is "1" or a high level, it indicates that the printer command feedback shielding function is turned on; and when the value of the printer command shielding flag is "0" or a low level, it indicates that the printer command feedback shielding function is turned off. In this step, the chip modifies the printer command shielding flag to "1" or a high level and writes the modified printer command shielding flag into the storage module to turn on the printer command feedback shielding function of the chip, and then the printer fails to receive the feedback from the chip and reports an error to prompt the user to open the cover to unplug or plug or replace the ink cartridge, leading the chip to the cover opening procedure. Of course, according to the design requirements, the printer command feedback shielding function may also be turned on under the control of a register (that is, the printer command shielding flag is stored in the register). For example, after the register is reset (the chip is powered down), the printer command shielding flag is cleared and the printer command feedback shielding function is turned off.

In step S2, a printer dock command is shielded and a chip core is turned off in the automatic reset state. The step "a printer dock command is shielded" in the present disclosure means that the chip does not make any feedback or response to the received printer dock command.

After the printer enters the cover opening procedure, the printer moves the consumable to the dock and sends one or more groups of printer dock commands to the consumable chip to detect whether the consumable of the printer is installed properly and whether the consumable is installed correctly. Each group of printer dock commands includes multiple printer dock commands In the embodiment, the chip determines whether the received printer command is a printer dock command and whether the count of groups of the currently shielded printer dock commands reaches a preset threshold, that is, whether the count of groups of the printer dock commands is N groups. If the printer command received by the chip is a printer dock command and the count of groups of the printer dock commands currently shielded does not reach the preset threshold, that is, N groups, the chip turns on the printer command feedback shielding function so that the chip does not make any feedback or response to the currently received printer dock command, counts and updates the count of groups of the shielded printer dock commands, and then writes the updated count of groups of the shielded printer dock commands into the storage module.

Of course, when the chip receives the first piece of printer dock command, the chip turns on the printer command feedback shielding function and turns off the chip core until the count of groups of the shielded printer dock commands of the chip reaches the preset threshold, that is, N groups. In this step, the printer command feedback shielding function of the chip is turned on by modifying the printer command shielding flag into "1" or a high level so that the chip does not make any feedback or response to the received printer dock command.

In step S3, the chip enters a reset allowing state after N groups of printer dock commands are shielded in the automatic reset state.

In the automatic reset state, the chip determines whether the received printer command is a printer dock command and whether the count of groups of the currently shielded printer dock commands reaches the preset threshold, that is, N groups. If the chip determines that the received printer command is a printer dock command and that the count of groups of the currently shielded printer dock commands reaches the preset threshold, that is, N groups, the chip sets a reset allowing flag to a specific value and writes the set reset allowing flag into the storage module, so that the chip enters the reset allowing state. The reset allowing flag in the storage module is used for marking whether the chip is allowed to be reset. Only when the reset allowing flag is set to a specific value, the chip enters the reset allowing state, and the chip is allowed to perform a reset operation to restore the ink amount of the chip to an initial value indicating the ink-full state. For example, in the embodiment, when the value of the reset allowing flag is a specific value "1" or a high level, it indicates that the chip is in the reset allowing state; and when the value of the reset allowing flag is a non-specific value "0" or a low level, it indicates that the chip is not in the reset allowing state.

Of course, according to the design requirements, after the count of groups of the currently shielded printer dock commands reaches the preset threshold, that is, N groups, the count of groups of the currently shielded printer dock commands is cleared, the automatic reset flag is cleared, and then the chip exits the automatic reset state.

In step S4, ink amount data is reset and the chip core is turned on in the reset allowing state.

After the chip shields the received N groups of printer dock commands, the printer determines that the consumable is installed incorrectly or that the consumable is not installed and then powers down the consumable, causing the consumable chip to be powered down. After the chip is powered down, the configuration parameters in the register (the value of the automatic reset flag, the count of groups of the shielded dock commands, the value of the reset allowing flag, and the initial ink amount value) are lost, and the configuration parameters need to be read from the storage module when the chip is powered up again. After the chip is powered up again, the chip reads the value of the reset allowing flag from the storage module, determines that the chip is in the reset allowing state, and overwrites ink amount information in a code table inforation area with a storage module initial ink amount, so that the value of the ink amount information in a code table information area in the storage module is restored to the initial value indicating the ink-full state and the chip core is turned on.

In step S5, the chip exits the reset allowing state.

After the chip resets the ink amount data, the chip needs to exit the reset allowing state to ensure that the chip can enter the subsequent normal working procedures after the ink amount data is reset. In the embodiment, the value of the reset allowing flag is set to a non-specific value "0" or a low level and written to the storage module to clear the reset allowing flag, and at this point, it is indicated that the chip is not in the reset allowing state.

In the embodiment, the storage module is a non-volatile storage module for ensuring that the configuration parameters of the chip will not be lost after the chip is powered down. Of course, according to the design requirements, the storage module can be a combination of volatile storage module and non-volatile storage module as long as the storage module can ensure that the configuration parameters of the chip stored in the volatile storage module are written back into the non-volatile storage module before the chip is powered down and thus ensure that the configuration parameters will not be lost after the chip is powered down.

Embodiment Two

An automatic reset method for a consumable chip is provided, and the method is applied to a control module of the consumable chip. The consumable chip also includes a chip core and a non-volatile storage module. The data stored in the non-volatile storage module is divided into: a code table information area (for storing serial number information, ink amount information, and other information of the consumable), a reset area (for storing an initial ink amount value of the consumable chip, that is, an ink-full value), and a function configuration parameter area (for storing a reset allowing flag, an automatic reset flag, a count of groups of shielded dock commands, and other configuration parameters). The control module applies the automatic reset method in the Embodiment one so that the automatic reset of the consumable chip in the embodiment can be achieved.

The automatic reset method in the embodiment runs in the control module of the consumable chip, and the workflow is shown in FIG. 1.

After the consumable chip is powered up, the control module of the chip reads the data (the reset allowing flag, the automatic reset flag, the count of groups of the shielded dock commands, and other configuration parameters) in the function configuration parameter area into the register. The control module can read all the data in the function configuration parameter area at one time, or read part of the data in the function configuration parameter area in a certain sequence according to the use requirements as shown in FIG. 1.

The control module determines whether the chip is in the reset allowing state, and if it is determined that the chip is in the reset allowing state, executes the reset operation in step S4 of the reset method in Embodiment one to restore the ink amount data of the chip to the initial value. For example, in the embodiment, the control module determines the value of the read reset allowing flag, if the value of the reset allowing flag is a specific value 1, which indicates that the chip is in the reset allowing state, the control module copies the initial ink amount value in the reset area of the non-volatile storage module and overwrites the ink amount information in the code table information area to reset the ink amount data of the chip. In order to enable the chip to be used normally after the ink amount data is reset, the control module, after resetting the ink amount data, clears the value of the reset allowing flag to be 0, that is, the value of the reset allowing flag is modified into a non-specific value, and writes the modified reset allowing flag into the non-volatile storage module to enable the chip to exit the reset allowing state. If the reset allowing flag is 0, which indicates that the chip is not in the reset allowing state, then the reset operation is not performed, and the control module turns on the chip core to make the chip core work normally and then waits for the printer to send a command and data.

The consumable chip, after receiving the command sent by the printer, collects command information and determines whether the received printer command is a printer dock command. The printer sends one or more groups of printer dock commands to the consumable chip only when the printer moves the consumable to the dock, so that the printer detects whether the consumable of the printer is installed properly and whether the consumable is installed correctly. Each group of printer dock commands includes multiple printer dock commands Therefore, whether the consumable is moved to the dock by the printer can be determined by determining whether the received printer command is a printer dock command. If it is determined that the received printer command is not a printer dock command, it indicates that the printer is in the normal working state.

Further, when the printer is in the normal working state, the control module detects the ink amount information in the printer command, determines whether the ink amount state reaches the ink-out state, and when it is determined that the ink amount state reaches the ink-out state, the chip enters the automatic reset state and shields the received printer command (that is, the chip executes step S1 in Embodiment one to perform the reset method described in Embodiment one). If the ink amount state does not reach the ink-out state, the chip core normally communicates with the printer. The "ink out" in the present disclosure may be a variety of cases, such as: 1. the ink consumption amount reaches a threshold; 2. the number of printing pages of the printer reaches a threshold; 3. the printing time reaches a threshold; and 4. the amount of remaining ink reaches a threshold. The following is described by using an example in which the ink consumption amount reaches a threshold. The consumable chip acquires an old ink amount INK_old and a new ink amount INK_new from the register of the chip core according to a command sent by the printer, calculates a difference value (the different value=(INK_old−INK_new), that is, the ink consumption amount of the current printing operation), and accumulates the ink consumption amount of each printing operation (that is, the total consumption amount) by repeating the above operations to determine the ink amount state. In the embodiment, an automatic reset flag is modified into a specific value 1 and written into the non-volatile storage module to cause the chip to enter the automatic reset state. In the embodiment, the printer command shielding flag is stored in the register, and the on and off of the printer command feedback shielding function is controlled through the register. The default value of the printer command shielding flag in the register is 0 so that the printer command feedback shielding function is automatically turned off after the chip is powered up again. In other embodiments, the printer command shielding flag can also be stored in the non-volatile storage module. Accordingly, in order to make the chip work normally, the printer command shielding flag needs to be set to 0 before the chip is powered down or after the chip is powered up again, so as to turn off the function. After the printer command feedback shielding function is turned on, the printer reports an error (at this point, the printer requires opening the cover to unplug or plug or replace the ink cartridge) and enters the cover opening procedure. In the cover opening procedure, the printer moves the consumable to the dock. When the consumable is moved to the dock, the consumable chip receives the printer dock command. When the control module determines that the received printer command is a printer dock command, the control module determines whether the chip is in the automatic reset state (that is, the control module determines whether the automatic reset state flag is a specific value 1). If the chip is in the automatic reset state, the steps S2 and S3 described in Embodiment one are executed: the printer command feedback shielding function is turned on and the chip core is turned off until the count of groups of the shielded printer dock commands reaches the preset threshold, that is, N groups. Specifically, the chip determines whether the received printer command is a printer dock command. If the printer command received by the chip is a printer dock command and the count of currently shielded printer dock command groups does not reach the preset threshold, that is, N groups, the printer command feedback shielding function of the chip is kept on (that is, the printer command shielding flag is "1") so that the chip shields the currently received printer dock command and counts and updates the count of groups of the shielded printer dock commands. If the printer command received by the chip is a printer dock command but the count of groups of the currently shielded printer dock commands reaches the preset threshold, that is, N groups, the control module clears the count of groups of the shielded dock commands and the automatic reset flag to be 0 and writes the cleared count and automatic reset flag into the non-volatile storage module to exit the automatic reset state. The control module modifies the reset allowing flag into a specific value 1 after the count of groups of the shielded printer dock commands reaches the preset N groups (when the value of the reset allowing flag is "1" or a high level, it indicates that the chip is in the reset allowing state; and when the value of the reset allowing flag is "0" or a low level, it indicates that the chip is not in the reset allowing state) and writes the modified reset allowing flag into the non-volatile storage module, thereby causing the chip to enter the reset allowing state. If the chip is not in the automatic reset state, the chip core normally communicates with the printer.

The printer reports an error when the ink-out condition is satisfied in the cover closing procedure, and the printer then starts the automatic reset procedure of cover opening only when the printer reports an error. When the consumable chip turns on the printer command feedback shielding function in the cover opening procedure, the printer may believe that the consumable has been plugged and then performs the power-down operation and the restarting operation on the consumable chip. After the consumable chip is powered up again, if the reset allowing flag is 1, the reset operation is performed, and the ink amount is modified into the initial value.

Embodiment Three

A consumable chip is provided. The consumable chip includes a chip core, a storage module, and a control module. The data stored in the storage module is divided into: a code table information area (for storing serial number information, ink amount information, and other information of the consumable), a reset area (for storing an initial ink amount value of the consumable chip, that is, an ink-full value), and a function configuration parameter area (for storing a reset allowing flag, an automatic reset flag, a count of groups of shielded dock commands, and other configuration parameters). The automatic reset method in Embodiment one or Embodiment two is applied in the control module so that the consumable chip in the embodiment can achieve the automatic reset. In the embodiment, the storage module is a non-volatile storage module for ensuring that the configuration parameters of the chip will not be lost after the chip is powered down. Of course, according to the design requirements, the storage module can be a combination of volatile storage module and non-volatile storage module as long as the storage module can ensure that the configuration parameters of the chip stored in the volatile storage module are written back into the non-volatile storage module before the chip is powered down and thus ensure that the configuration parameters will not be lost after the chip is powered down.

Although the embodiments of the present disclosure have been described in conjunction with the drawings, various variations or modifications can be made by those skilled in the art within the scope of the appended claims.

What is claimed is:

1. An automatic reset method for a consumable chip, comprising:
   in response to determining that an ink amount state is an ink-out state, entering an automatic reset state and shielding a printer command;
   shielding a printer dock command and turning off a chip core in the automatic reset state;
   entering a reset allowing state after shielding N groups of printer dock commands in the automatic reset state; and
   resetting ink amount data and turning on the chip core in the reset allowing state.

2. The automatic reset method for the consumable chip according to claim 1, further comprising: rewriting an automatic reset flag into a specific value and writing the rewritten automatic reset flag into a storage module to cause the chip to enter the automatic reset state.

3. The automatic reset method for the consumable chip according to claim 1, further comprising: in the automatic reset state, determining whether a received printer command is a printer dock command and whether a count of groups of currently shielded printer dock commands reaches a preset threshold N, and turning on a printer command feedback shielding function and turning off the chip core or causing the chip to enter the reset allowing state according to the determination result.

4. The automatic reset method for the consumable chip according to claim 3, further comprising:
   in the automatic reset state, in response to receiving a first piece of printer dock command, turning on the printer command feedback shielding function and turning off the chip core until the count of groups of the shielded printer dock commands reaches the preset threshold N.

5. The automatic reset method for the consumable chip according to claim 3, further comprising:
   in response to determining that the received printer command is a printer dock command and that the count of groups of the currently shielded printer dock commands does not reach the preset threshold N, shielding, by the chip, the received printer dock command, updating the count of groups of the shielded printer dock commands, writing the updated count of groups of the shielded printer dock commands into the storage module, turning on the printer command feedback shielding function, and turning off the chip core.

6. The automatic reset method for the consumable chip according to claim 3, further comprising:
   in response to determining that the received printer command is a printer dock command and that the count of groups of the currently shielded printer dock commands reaches the preset threshold N, clearing, by the chip, the count of groups of the currently shielded printer dock commands and a value of an automatic reset flag, setting a reset allowing flag to a specific value, and writing the set reset allowing flag into the storage module to cause the chip to enter the reset allowing state.

7. The automatic reset method for the consumable chip according to claim 1, further comprising:

in the reset allowing state, overwriting ink amount information in a code table information area with a storage module initial ink amount to achieve reset of the ink amount data, and turning on the chip core.

8. The automatic reset method for the consumable chip according to claim 1, further comprising:

exiting the reset allowing state after resetting the ink amount data.

9. The automatic reset method for the consumable chip according to claim 7, further comprising:

in the reset allowing state, after resetting the ink amount data, modifying the set reset allowing flag into a non-specific value, and writing the modified reset allowing flag into the storage module to cause the chip to exit the reset allowing state.

10. A consumable chip, comprising:

a chip core;

a storage module, comprising a code table information area for storing current ink amount data and a function configuration parameter area for storing a reset allowing flag, an automatic reset flag, and a count of groups of shielded printer dock commands; and a control module which is configured to:

in response to determining that an ink amount state is an ink-out state, enter an automatic reset state and shielding a printer command;

shield a printer dock command and turn off a chip core in the automatic reset state;

enter a reset allowing state after shielding N groups of printer dock commands in the automatic reset state; and reset ink amount data and turn on the chip core in the reset allowing state.

11. The consumable chip according to claim 10, wherein the control module is further configured to: rewrite an automatic reset flag into a specific value and write the rewritten automatic reset flag into a storage module to cause the chip to enter the automatic reset state.

12. The consumable chip according to claim 10, wherein the control module is further configured to: in the automatic reset state, determine whether a received printer command is a printer dock command and whether a count of groups of currently shielded printer dock commands reaches a preset threshold N, and turn on a printer command feedback shielding function and turn off the chip core or cause the chip to enter the reset allowing state according to the determination result.

13. The consumable chip according to claim 12, wherein the control module is further configured to:

in the automatic reset state, in response to receiving a first piece of printer dock command, turn on the printer command feedback shielding function and turn off the chip core until the count of groups of the shielded printer dock commands reaches the preset threshold N.

14. The consumable chip according to claim 12, wherein the control module is further configured to:

in response to determining that the received printer command is a printer dock command and that the count of groups of the currently shielded printer dock commands does not reach the preset threshold N, shield, by the chip, the received printer dock command, update the count of groups of the shielded printer dock commands, write the updated count of groups of the shielded printer dock commands into the storage module, turn on the printer command feedback shielding function, and turn off the chip core.

15. The consumable chip according to claim 12, wherein the control module is further configured to:

in response to determining that the received printer command is a printer dock command and that the count of groups of the currently shielded printer dock commands reaches the preset threshold N, clear, by the chip, the count of groups of the currently shielded printer dock commands and a value of an automatic reset flag, set a reset allowing the flag to a specific value, and write the set reset allowing flag into the storage module to cause the chip to enter the reset allowing state.

16. The consumable chip according to claim 10, wherein the control module is further configured to:

in the reset allowing state, overwrite ink amount information in a code table information area a storage module initial ink amount to achieve reset of the ink amount data, and turning on the chip core.

17. The consumable chip according to claim 10, wherein the control module is further configured to:

exit the reset allowing state after resetting the ink amount data.

18. The consumable chip according to claim 16, wherein the control module is further configured to:

in the reset allowing state, after resetting the ink amount data, modify the set reset allowing flag into a non-specific value, and write the modified reset allowing flag into the storage module to cause the chip to exit the reset allowing state.

* * * * *

UNITED STATES PATENT AND TRADEMARK OFFICE
CERTIFICATE OF CORRECTION

PATENT NO. : 11,710,018 B2  
APPLICATION NO. : 17/618308  
DATED : July 25, 2023  
INVENTOR(S) : Haijian Yu et al.

Page 1 of 1

It is certified that error appears in the above-identified patent and that said Letters Patent is hereby corrected as shown below:

In the Claims

Column 12, Claim 16, Line 37, delete "area a" and insert --area with a--.

Signed and Sealed this  
Tenth Day of October, 2023

Katherine Kelly Vidal  
*Director of the United States Patent and Trademark Office*